United States Patent [11] 3,545,769

| | | |
|---|---|---|
| [72] | Inventor | Frederick L. Berridge<br>Montreal, Quebec, Canada |
| [21] | Appl. No. | 628,692 |
| [22] | Filed | April 5, 1967 |
| [45] | Patented | Dec. 8, 1970 |
| [73] | Assignee | Joseph Robb & Company Limited<br>Montreal, Quebec, Canada |

[54] OIL SEAL FOR JOURNAL BEARINGS
1 Claim, 6 Drawing Figs.

[52] U.S. Cl. .................................................. 277/131,
277/230, 277/237
[51] Int. Cl. ........................................................ F16j 15/16
[50] Field of Search ............................................ 277/130-
—132, 227—231, 237(A), (ATD)

[56] References Cited
UNITED STATES PATENTS
572,883  12/1896  Flynt .......................... 277/237(A)UX 2,977,143  3/1961  Talamonti ..................... 277/227
2,982,571  5/1961  Hoyer ........................... 277/130X

*Primary Examiner*—Laverne D. Geiger
*Assistant Examiner*—Jeffrey S. Mednick
*Attorney*—Fetherstonhaugh and Company ABSTRACT: An oil and dust guard seal for railroad car journal boxes comprising a body member formed of an elastomeric material having an aperture through which the car journal passes and a tightly braided annular insert, which has first been coated on three sides with a vulcanizable material, is moulded integral with the body member so that the uncoated surface of the annular insert projects radially inwards from the peripheral surface of the aperture in the body member to provide an oil-absorbent journal sealing surface.

PATENTED DEC 8 1970 3,545,769

INVENTOR
F. L. BERRIDGE
Fetherstonhaugh & Co.
ATTORNEYS

OIL SEAL FOR JOURNAL BEARINGS

The present invention relates to an oil and dust seal for use primarily in railway journal boxes, and particularly relates to a method of securing a journal-contacting annular braided insert member to the journal seal body.

Oil and dust seals or guards are provided in railway journal boxes to guard against escape of lubricating oil therefrom and also to prevent the entrance of dust and other foreign matter into the journal box. As is well known the wheels of a railway car are carried by an axle, each end (journal) of which is supported and rotatably positioned within a journal box by means of sleeve, roller or other types of bearings. As railway cars and equipment are extremely heavy with the full weight being taken by the journal box bearings in direct contact with the axle journal it is of utmost importance that the lubricating oil in the journal box be maintained at the proper level and that the entrance of dust or other foreign material which would impair the lubricating function of the oil be prevented.

Some of the journal box oil and dust seals available on the market are made from a resilient material, such as synthetic rubber, and comprise a flattened body portion in which a large aperture is provided and through which the axle journal extends. It presents little difficulty to secure the outer periphery of the body portion of the seal to the journal box to prevent oil escape and dust entrance, but to date the attempts at providing a successful contact between the stationary oil and dust seal of the rotating axle have been unsuccessful. Efforts have been made to provide the seal with a woven fabric rope or cord insert made from for example wool thread or the like, in contact with the axle journal but such efforts have proved unsatisfactory, mostly by reason of the disintegration of the woven material and the failure to provide a satisfactory bond between the seal body portion and the loosely woven insert. These attempts have also proved unworkable in view of the use of woven fabric seals of weaves which do not possess sufficient inherent strength and tightness to withstand the abuses to which they are submitted.

The present invention contemplates an oil and dust seal for journal boxes comprising a resilient flattened body portion secured around its periphery to or within the journal box, and a large aperture provided in the body portion and through which the axle extends, and a firm and solid, substantially square braided annular sealing insert (with or without a central core) secured within the aperture for oil and dust sealing contact with the axle journal, and means for securely bonding the annular sealing insert to the resilient body portion. The use according to the present invention of a tight, firm, substantially square, braided sealing insert has proved superior to anything used in the past and the means for securing the insert within the journal seal body has also proved extremely successful. The braided annular insert, due to the material characteristics and tightly braided construction will not bind on the car journal or provide excessive clearance due to temperature extremes. The braided sealing insert may also be oil absorbent to provide a wiping and sealing action on the rotating axle journal although it has been found that in view of the inherent strength and characteristics of the braid and the minimum friction which it presents to the journal and the secure bonding of the annular insert to the seal body, that the journal seal will function effectively as a dust seal for a considerable period of time even in a dry, nonlubricated condition.

The differences between braiding and simple weaving should be clearly kept in mind. By braiding we mean a plaiting operation of three or more strands of material, such as rope, lace or the like, intwined or braided together on a braiding machine. Weaving on the other hand represents a simple interlacing of yarn materials or thread or the like, as by a loom.

It has been found that the simple weaving of material over a central core does not result in a product of sufficient strength and durability to be used as sealing wipers in journal box seals, and that a strong, firm, braided product is necessary for successful results.

The braided insert of this invention may be braided from various materials both of the oil-absorbent and nonabsorbent variety. Of the oil-absorbent materials cotton for example may be used, and nylon is an example of the use of nonabsorbent materials. Cotton which will absorb oil provides an excellent oil wiping action on the rotating axle journal, and while nylon which itself is nonabsorbent will also provide an excellent oil wiping reservoir due to capillary action between the various braided nylon strands.

The sealing of the annular braided insert to the flexible body portion of the journal seal according to the present invention comprises coating a strong braided annular insert, which is generally rectangularly shaped in cross section, on three sides with one or more coatings of a vulcanizable material such as rubber cement or the like which is then heat-hardened integral with the braided insert to obtain rigidity in the insert, and then placing the annular insert in a mold defining the shape of the journal box seal, filling the mold with vulcanizable material such as synthetic rubber or the like, and subjecting the material and the braided insert to high heat and pressure to vulcanize the material forming the seal body in integral contact with the annular insert.

It is the principle object of the present invention then to provide a railway journal oil and dust seal comprising a flattened body portion of flexible material having a large aperture provided in the body through which a railway axle journal extends, and a braided annular insert secured to the body portions and in sealing contact with the axle journal.

It is a further object to provide a railway journal box oil and dust seal having secured thereto a braided annular sealing insert secured thereto for sealing contact with an axle journal, and means to secure the annular insert to the body portion.

It is still a further object to provide a journal box oil and dust seal comprising a main body portion and an oil-absorbent firm, strong, square braided annular insert secured to the body portion for sealing contact with an axle journal which is durable and reliable, and means for securing the insert to the body portion.

It is still a further object to provide means for securing an axle journal-contacting braided annular insert of oil-absorbent or nonabsorbent material to a flexible oil and dust seal for use primarily in railway journal boxed. thereof Still a further object is to provide means for securing a braided axle journal-contacting insert to a railway journal box seal body, comprising a main body portion made of flexible material, such as synthetic rubber, which securing is accomplished by providing a strong, braided annular insert which is substantially rectangular in cross section with one or more coatings of a vulcanizable material such as rubber cement or the like on three sides thereof and placing the insert in a mold defining the journal box seal, filling the mold with vulcanizable material such as synthetic rubber and subjecting the material and insert to high heat and pressure to vulcanize the material in integral contact with the coatings provided on the insert.

These and other objects will become apparent from the following description in conjunction with the accompanying drawings wherein:

FIG. 2 illustrates the braid shown in FIG. 1 coated with one or more coatings of a vulcanizable material such as rubber cement or the like;

Figure 1:
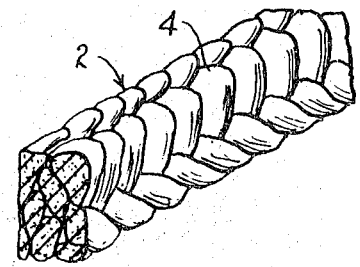
FIG. 1 illustrates in perspective view, partially in section, a portion of the braid according to the present invention.
Figure 2:
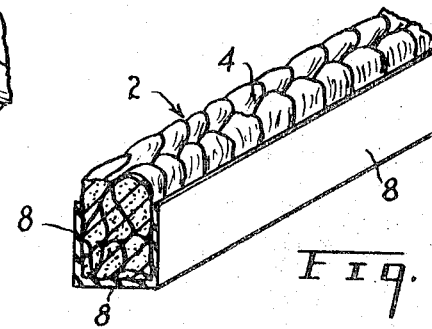
Figure 3:
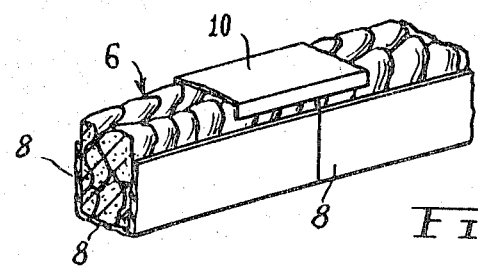
FIG. 3 illustrates in perspective view the joining of two ends of a strip of braided material to form an annular ring or insert.

In the drawings FIGS. 1 and 2 show portions (generally indicated at 2) of a length of square braided material which is strong and tightly braided on a braiding machine and then calendered on a calendering machine to give the braid a generally rectangular (substantially square) configuration in cross section. The calendering also helps to tighten the braid, and the four sided configuration presents a flat surface (see 4) facing inwardly for maximum wiping contact with the axle journal while providing three sides for securement to the body portion of the journal seal. It has been found that using this design of wiping insert that it is sufficient to use only one insert per journal seal and not the two or more shown in the prior art.

After braiding and rectangularly-forming the length of braided material is then coated on one edge surface and partially coated on two sides with a vulcanizable material such as rubber cement 8 (see FIG. 2) and is then passed through a heated oven to dry the coating.

The first coating of rubber cement 8 or vulcanizable material will, preferably have very little penetration or absorption action on the braided material and seals the coated surfaces in preparation to receive coatings of vulcanizing cements.

A second coating vulcanizing rubber cement may then be applied over the first coating providing the braided material with rigidity and a rubber hub to which the body of the journal seal may be vulcanized. Further coatings of cement may be applied each coating followed by heating, is such is found necessary due to the nature of the material from which the braided insert is made.

It will be noted from FIGS. 2, 3, 4 and 5 that the coatings 8 on the sides of the braided material stop a short distance from side 4.

The braided material 2 coated on three sides with at least two coatings of a vulcanizing material 8 is now cut into lengths required to form the annular insert 6 (FIG. 6) and is held in annular form by securing the ends together by a spot of vulcanizable material or cement 10 (see FIG. 3) applied to the inward forming surface 4 of the four sided ring. This spot 10 of vulcanizable material does not effect the wiping and sealing action of the ring on the axle journal, and when positioning the ring for vulcanization with the body portion of the journal seal the spot may be placed in position in the mould so as to be located to contact the top portion of the axle journal when the journal seal is positioned in the journal box.

Figure 4:
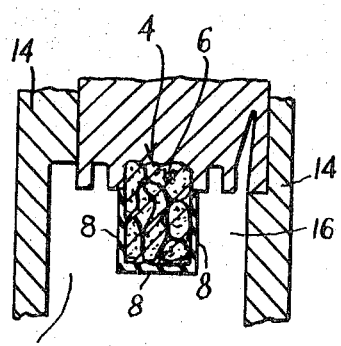
FIG. 4 illustrates in cross section the positioning of the coated braided insert in a vulcanizing mold.

The rigid coated braided annular ring is then placed in a vulcanizing mold, two sections of which are shown at 12 and 14 in FIG. 4, with the wiping contact face 4 positioned in a recess provided in mold section 12. The coatings 8 are exposed to the inner cavity 16 of the mold. The cavity 16 is then filled with a vulcanizable material such as synthetic rubber or the like and vulcanized under heat and pressure of at least 2000 pounds pressure to form the journal seal body unit 20 (see FIG. 6) with the insert ring 6 integrally secured thereto. Upon vulcanization the coating 8 on the wiper ring 6 vulcanizes integrally with the material forming the body portion of the oil and dust journal seal.

Figure 5:
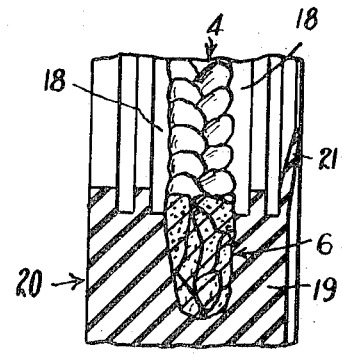
FIG. 5 illustrates in cross section a portion of a vulcanized dust and oil journal seal with the braided insert secured therein.
Figure 6:
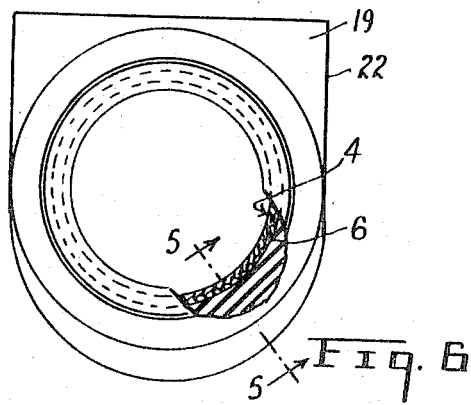
FIG. 6 illustrates a completed dust and oil journal seal in side elevation and being cut out to show the positioning of the square braided annular insert therein.

FIG. 5 illustrating a cross section view of the portion of the journal seal is actually a view along line 5-5 of FIG. 6, and shows slight distortion of the braided insert ring 6 due to the high vulcanizing pressures, and the annular grooves 18 positioned adjacent the insert ring act as oil traps or reservoirs to supply lubricating oil to the insert ring 6.

The body portion 19 of the journal seal 20 may be provided with a resilient flange 21 for engaging the rotating axle journal as shown.

FIG. 6 illustrates in side elevation a complete journal seal 20 ready for insertion in a railway car journal box. The outer periphery 22 of the seal is secured to the journal box in any known manner and the axle journal (not shown) projects through the aperture and is wipingly contacted by the annular insert 6.

Due to the strong and tight braid of the insert ring and the secure bonding between the insert and the journal seal body portion, the braided ring will not disintegrate or tear loose from the journal seal body during operation, as exhaustive tests at −40° F. and +175° F. at a speed of 60 m.p.h. and over with or without oil lubrication have proved. claim: I Claim:

1. An oil and dust seal for journal boxes of railway cars, comprising a vulcanized resilient seal body having a journal receiving aperture therein defined by an inner peripheral surface of said body, said inner peripheral surface of the body being provided with an inner peripheral groove which is substantially deeper in the radial direction than it is wide on the axial direction, an annular insert of a firm, tightly braided, oil absorbent material disposed in said groove and securely bonded to said seal body, the cross section of said insert corresponding substantially to that of said groove but an inner peripheral edge portion of the insert, having a radial dimension substantially smaller than the depth of the groove, projecting radially inwardly from the groove beyond the inner peripheral surface of said body for sealingly engaging a journal, and at least two radially inwardly projecting rings provided integrally on the inner peripheral surface of said body in axially spaced relation from the respective opposite sides of said inner peripheral portion of said insert and coacting therewith to provide oil retaining channels at the opposite sides of the insert.